(12) United States Patent
Byon et al.

(10) Patent No.: US 11,870,933 B2
(45) Date of Patent: Jan. 9, 2024

(54) EMERGENCY DISPATCH COMMAND INFORMATION MANAGEMENT SYSTEM, DEVICE, AND METHOD CAPABLE OF PROVIDING RELEVANT EMERGENCY DISPATCH COMMAND INFORMATION

(71) Applicant: ELECTRONICS AND TELECOMMUNICATIONS RESEARCH INSTITUTE, Daejeon (KR)

(72) Inventors: Sung Won Byon, Daejeon (KR); Eun Jung Kwon, Daejeon (KR); Hyun Ho Park, Daejeon (KR); Dong Man Jang, Daejeon (KR); Eui Suk Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/824,214

(22) Filed: May 25, 2022

(65) Prior Publication Data

US 2023/0063694 A1    Mar. 2, 2023

(30) Foreign Application Priority Data

Aug. 25, 2021 (KR) .......................... 10-2021-0112260

(51) Int. Cl.
*H04M 3/51*    (2006.01)
(52) U.S. Cl.
CPC ...... *H04M 3/5116* (2013.01); *H04M 2201/40* (2013.01)

(58) Field of Classification Search
None
See application file for complete search history.

(56) References Cited

U.S. PATENT DOCUMENTS

| | | | |
|---|---|---|---|
| 9,420,099 B1 * | 8/2016 | Krishnan | ................ H04W 4/90 |
| 10,813,202 B2 | 10/2020 | Kim et al. | |
| 2002/0106059 A1 * | 8/2002 | Kroll | ...................... H04M 11/04 |
| | | | 379/45 |
| 2021/0073256 A1 | 3/2021 | Park | |

FOREIGN PATENT DOCUMENTS

| | | |
|---|---|---|
| KR | 100866783 B1 | 11/2008 |
| KR | 20120138915 A | 12/2012 |
| KR | 101602482 B1 | 3/2016 |
| KR | 20170062820 A | 6/2017 |
| KR | 20170106616 A | 9/2017 |
| KR | 102085353 B1 | 3/2020 |
| KR | 20210075511 A | 6/2021 |

* cited by examiner

*Primary Examiner* — Hemant S Patel
(74) *Attorney, Agent, or Firm* — Rabin & Berdo, P.C.

(57) ABSTRACT

Provided is an emergency dispatch command information management method capable of providing relevant emergency dispatch command information. The method includes: a step of receiving report input data from a reporter terminal; a step of generating reception input data of a recipient on the basis of the report input data; a step of generating first emergency dispatch command information on the basis of the reception input data; a step of detecting at least one second emergency dispatch command information relevant to the generated first emergency dispatch command information; and a step of transmitting the first and second emergency dispatch command information to a command receiver terminal.

15 Claims, 6 Drawing Sheets

FIG. 3

| EMERGENCY DISPATCH COMMAND INFORMATION 1 ||
|---|---|
| INCIDENT LOCATION | CHUNGJEONG-RO 2-GA XXX, SEODAEMUN-GU, SEOUL |
| RECEPTION TIME | 2021-07-31 17:57:51 |
| INCIDENT TYPE | VIOLENCE |
| REPORT CONTENTS | ONE PERSON RUNS AWAY AND ANOTHER MAN IS CHASING AFTER HIM WITH HAMMER |

FIG. 4

| EMERGENCY DISPATCH COMMAND INFORMATION 2 ||
|---|---|
| INCIDENT LOCATION | CHUNGJEONG-RO 2-GA YYY, SEODAEMUN-GU, SEOUL |
| RECEPTION TIME | 2021-07-31 18:01:05 |
| INCIDENT TYPE | VIOLENCE |
| REPORT CONTENTS | MAN BLEEDING CAME INTO STORE AND ASKED FOR REPORT TO POLICE |

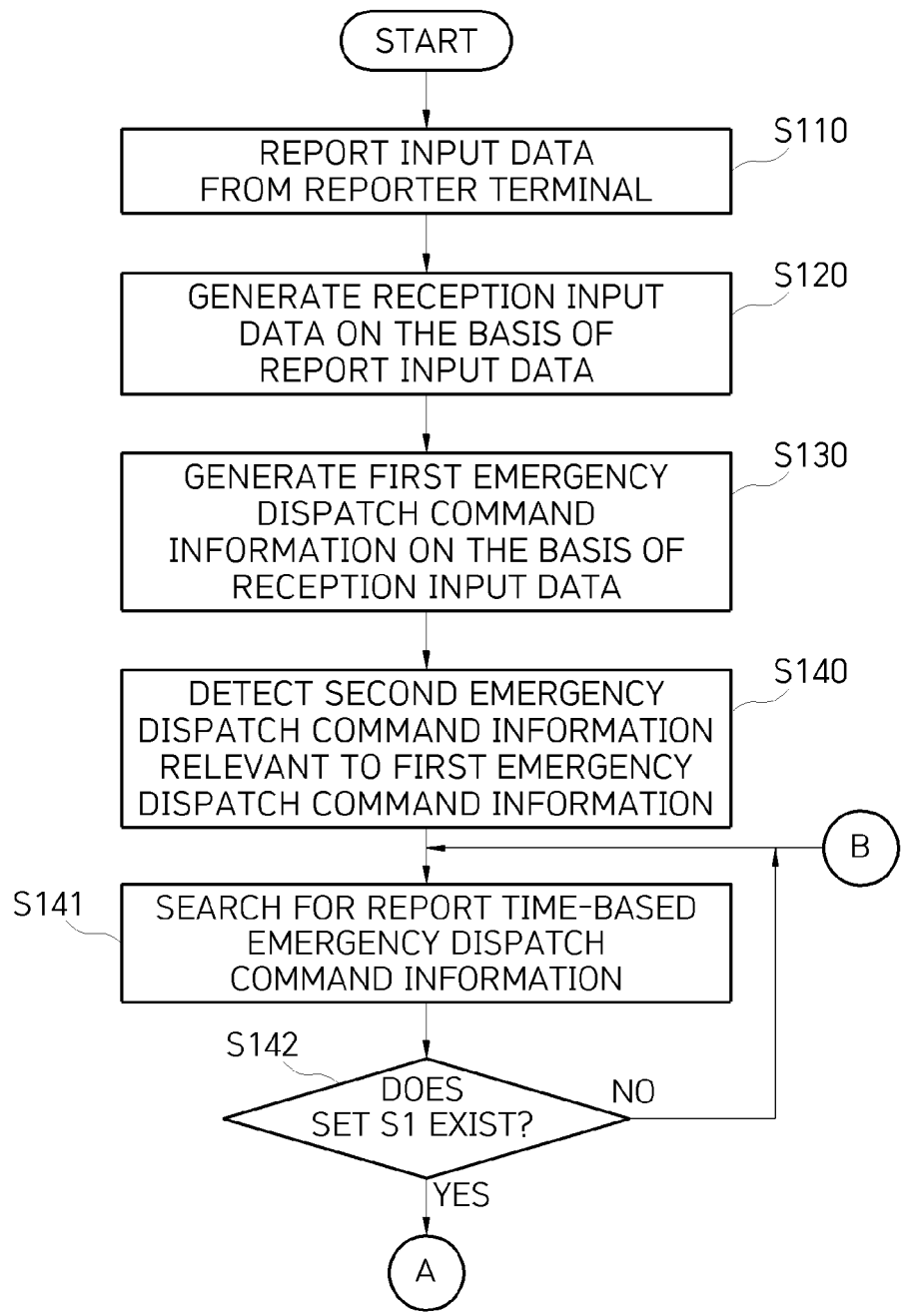

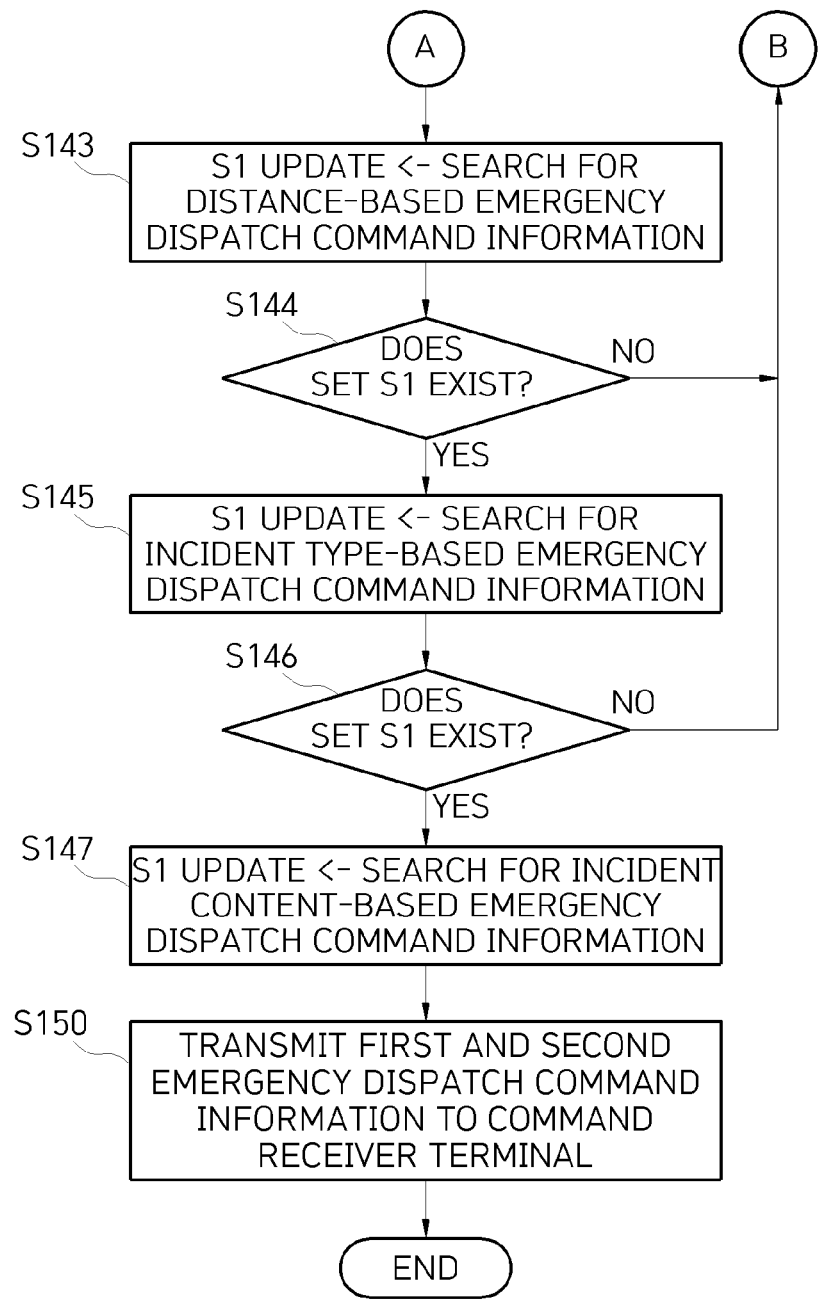

EMERGENCY DISPATCH COMMAND INFORMATION MANAGEMENT SYSTEM, DEVICE, AND METHOD CAPABLE OF PROVIDING RELEVANT EMERGENCY DISPATCH COMMAND INFORMATION

CROSS-REFERENCE TO RELATED APPLICATION

This application claims priority to and the benefit of Korean Patent Application No. 10-2021-0112260, filed on Aug. 25, 2021, the disclosure of which is incorporated herein by reference in its entirety.

BACKGROUND

1. Technical Field

The present disclosure relates to an emergency dispatch command information management system, device, and method capable of providing relevant emergency dispatch command information. This research was supported and funded by the Korean National Police Agency (Project Name: 112 Emergency Dispatch Decision Support system/Project Number PR08-03-000-21).

2. Related Art

In all emergency dispatch agencies such as police stations and fire stations, emergency dispatch is carried out on the basis of contents of reports provided by witnesses or parties of an incident or accident.

In the event of a disaster such as a fire or an incident such as a crime, since the scale of human or material damage is determined according to emergency dispatch and initial action, it is necessary to receive and respond to reports promptly and accurately for each incident and accident.

However, when the same reporter reports multiple times for the same incident, when there are multiple reporters, or when reports by multiple reporters are received by multiple recipients, a recipient of a report reception agency subjectively determines whether it is the same incident and transmits a command to a competent department. Therefore, there are many difficulties in that the same incident is classified into different incidents or the command is transmitted to different competent departments.

SUMMARY

Various embodiments are directed to providing emergency dispatch command information management system, device, and method capable of providing relevant emergency dispatch command information, which can receive report data and issue emergency dispatch command information together with providing other previous emergency dispatch command information relevant to the emergency dispatch command information.

However, the problems to be solved by the present disclosure are not limited to the above-described problems, and other problems may be present.

In order to solve the above-described problems, an emergency dispatch command information management method capable of providing relevant emergency dispatch command information in accordance with a first aspect of the present disclosure may include: a step of receiving report input data from a reporter terminal; a step of generating reception input data of a recipient on the basis of the report input data; a step of generating first emergency dispatch command information on the basis of the reception input data; a step of detecting at least one second emergency dispatch command information relevant to the generated first emergency dispatch command information; and a step of transmitting the first and second emergency dispatch command information to a command receiver terminal.

Furthermore, an emergency dispatch command information management device capable of providing relevant emergency dispatch command information in accordance with a second aspect of the present disclosure may include: a report reception unit configured to receive report input data from a reporter terminal, generate reception input data of a recipient on the basis of the report input data, and generate first emergency dispatch command information on the basis of the reception input data; a relevant command detection unit configured to detect at least one second emergency dispatch command information relevant to the generated first emergency dispatch command information; and a command transmission unit configured to transmit the first and second emergency dispatch command information to a command receiver terminal.

Furthermore, an emergency dispatch command information management system capable of providing relevant emergency dispatch command information in accordance with a third aspect of the present disclosure may include: a reporter terminal configured to transmit report input data of a reporter; an emergency dispatch command information management device configured to receive the report input data from the reporter terminal, generate reception input data of a recipient on the basis of the report input data, generate first emergency dispatch command information on the basis of the reception input data, and detect at least one second emergency dispatch command information relevant to the generated first emergency dispatch command information; and a command receiver terminal configured to receive the first and second emergency dispatch command information.

In order to solve the above-described problems, a computer program in accordance with another aspect of the present disclosure is coupled to a computer as hardware, executes an emergency dispatch command information management method capable of providing relevant emergency dispatch command information, and is stored in a computer readable recording medium.

The other details of the present disclosure are included in the detailed descriptions and the drawings.

In accordance with an embodiment of the present disclosure described above, when an emergency dispatch command is issued, even a recently issued command relevant to a newly issued command may be provided to a command receiver terminal together. That is, since one incident may be reported and received with different contents by different persons involved depending on the time, and a police officer or a firefighter who is emergently dispatched and performs an emergency action for the incident may ascertain other report contents relevant to actual dispatch in order to increase the efficiency and safety of action. Furthermore, since related reports and commands may be grouped, it is possible to more efficiently ascertain the flow of incidents after emergency dispatch.

Moreover, through the present disclosure, reports on the same incident can be confirmed before dispatch, so that it is possible to prevent duplicate dispatches of multiple agencies and multiple personnel for the same incident. For example, in the case of a fire incident based on a 119 report, multiple reports may be received for the same incident, which may cause duplicate dispatches. However, according to the present disclosure, it is possible to prevent the occurrence of duplicate dispatches by determining multiple reports as a single incident through correlation analysis and providing a command to a command receiver terminal.

The effects of the present disclosure are not limited to the above-mentioned effects, and the other effects which are not mentioned herein will be clearly understood from the following descriptions by those skilled in the art.

BRIEF DESCRIPTION OF THE DRAWINGS

FIG. 3 is a diagram illustrating contents of emergency dispatch command information provided through a command receiver terminal.

FIG. 4 is a diagram illustrating contents of emergency dispatch command information provided through the command receiver terminal for the same incident as FIG. 3.

FIGS. 8A and 8B are flowchart illustrating an emergency dispatch command information management method in accordance with an embodiment of the present disclosure.

DETAILED DESCRIPTION

Figure 1:
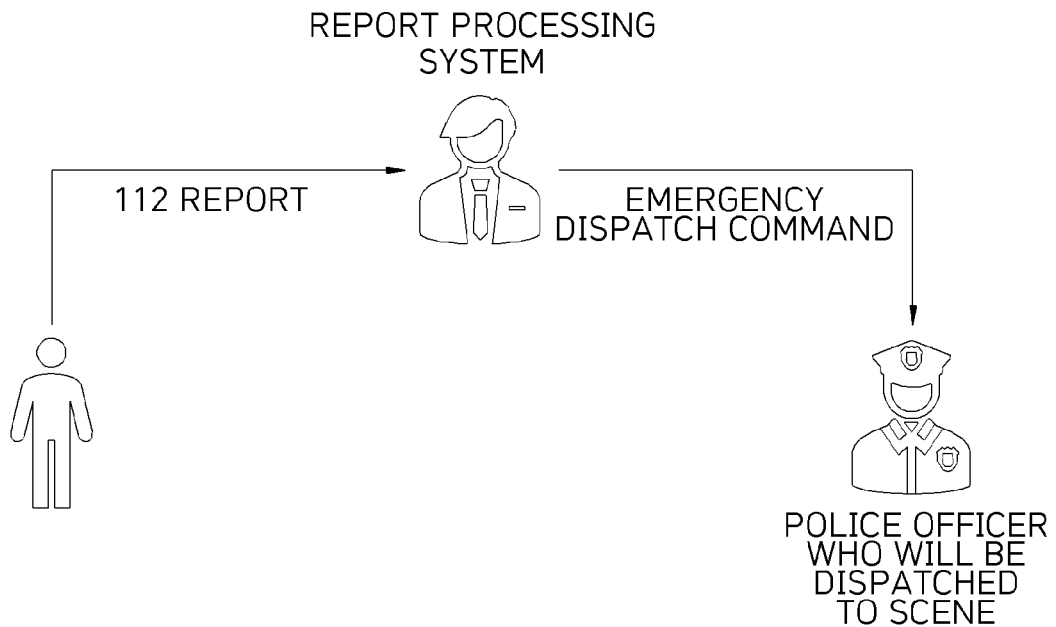
FIG. 1 is a diagram for schematically explaining a process in which a police station receives a report and dispatches a police officer.

The advantages and characteristics of the present disclosure and a method for achieving the advantages and characteristics will be clearly understood through embodiments to be described in detail together with the accompanying drawings. However, the present disclosure is not limited to the following embodiments, but may be implemented in various shapes different from each other, and the present embodiments are provided to bring the disclosure of the present disclosure to perfection and assist those skilled in the art to completely understand the scope of the present disclosure. Therefore, the scope of the present disclosure is defined only by claims.

Terms used in the present specification are used for describing embodiments, not limiting the present disclosure. The terms of a singular form in the present specification may include plural forms unless specifically mentioned. The meaning of 'comprise' and 'comprising' used in the specification does not exclude the presence or addition of one or more other components in addition to the mentioned components. Throughout the specification, like reference numerals represent the same components, and the term "and/or" includes each of mentioned components and one or more combinations thereof. Although terms "first" and "second" are used to describe various components, the components are not limited by the terms. The terms are used only to distinguish one element from another element. Therefore, a first component described below may be a second component within the technical idea of the present disclosure.

Unless defined differently, all terms (including technical and scientific terms) used in this specification may be used as meanings which may be commonly understood by those skilled in the art to which the present disclosure pertains. Furthermore, terms which are defined in generally used dictionaries are not ideally or excessively construed unless clearly and specifically defined.

First, a process performed by a general report processing system will be described with reference to FIG. 1 to FIG. 4, and then details performed by an embodiment of the present disclosure will be described with reference to FIG. 5 and subsequent drawings.

FIG. 1 is a diagram for schematically explaining a process in which a police station receives a report and dispatches a police officer.

A 112 report processing system connects a call made by a reporter to a recipient, and the recipient listens to report contents through the call with the reporter and inputs the contents to the system.

The recipient determines the severity of the incident according to the received report contents, and if necessary, issues an emergency dispatch command to a police officer who will be dispatched to the scene. When the emergency dispatch command is issued, the police officer assigned the incident checks the emergency dispatch command and then is dispatched to the scene.

On the other hand, it is important to arrive at the scene as soon as possible in the case of 112 or 119 emergency dispatch. Accordingly, when a report is received and the location of an incident and the severity of the incident are determined, an emergency dispatch command is issued to a resource close to the incident scene, and then additional information is provided as needed to a field agent who is on his/her way or arrived at the scene.

To this end, the 112 or 119 report processing system may have a report reception function of receiving a report and inputting report contents to the system, and a command transmission function of transmitting the input report contents to a police officer who will be dispatched to the scene, and the system is continuously being improved to carry out, in the shortest time, the process of receiving a report, issuing a dispatch command, and arriving at the scene.

Figure 2:
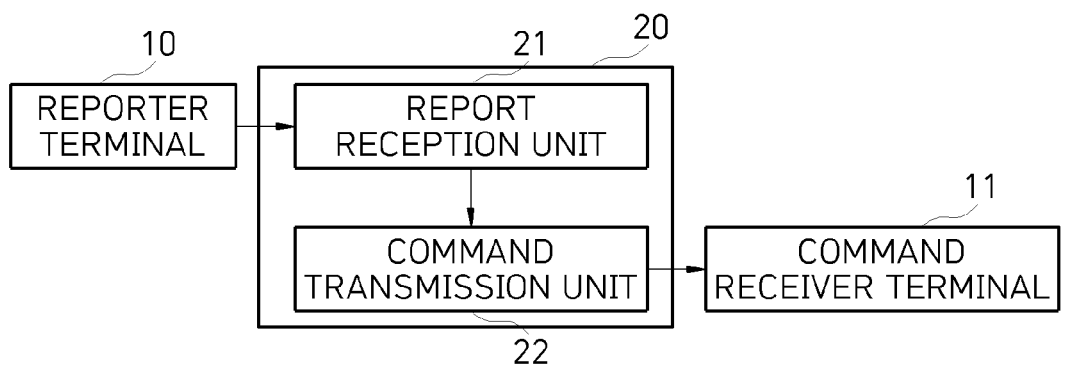
FIG. 2 is a diagram schematically illustrating a 112 report processing system for processing a 112 report.

FIG. 2 is a diagram schematically illustrating a 112 report processing system 20 for processing a 112 report.

When a report is received from a reporter terminal 10, a recipient ascertains report contents through a call with the reporter and inputs the ascertained report contents to the report processing system 20.

Then, when emergency dispatch is required according to the report contents, the recipient generates and issues an emergency dispatch command on the basis of the report contents. At this time, the recipient assigns the incident to a competent authority on the basis of the location of the report and the dispatch distance.

Then, when the emergency dispatch command is issued from a report reception unit 21, a command transmission unit 22 transmits the emergency dispatch command to an assigned command receiver terminal 11. When the command is transmitted to the command receiver terminal 11, a police officer checks contents of the emergency dispatch command through the command receiver terminal 11 and is dispatched to the scene.

FIG. 3 is a diagram illustrating the contents of emergency dispatch command information provided through the command receiver terminal 11.

The emergency dispatch command information received by the command receiver terminal 11 includes an incident location, a reception time, an incident type, and report contents as main contents. The police officer to be dispatched checks contents of the command, ascertains incident contents, and is dispatched to the incident location. On the other hand, the emergency dispatch command information may include data such as notes for providing information necessary for on-site action as needed according to the incident type, in addition to the main contents such as the location and the reception time.

As described above, the report processing system for receiving reports and providing emergency dispatch command information was developed for the purpose of prompt transmission of report situations so that a police officer or a firefighter can arrive at the scene more quickly. By using the report processing system, a police officer or a firefighter can ascertain the incident with a received command and be quickly dispatched to the scene.

On the other hand, a command receiver, such as a police officer or a firefighter, who receives the emergency dispatch command, ascertains the incident contents through the emergency dispatch command information transmitted to the command receiver terminal 11. At this time, there may be multiple reports for one incident, and when a reporter use the same phone to report an incident, the phone number of the reporter is included in report information. Thus, whether it is the same incident can be determined using the phone number of the reporter.

However, multiple reporters may sometimes report the same incident occasionally, and in this case, different recipients may receive the reports. That is, there may cases where one reporter reports an incident or a plurality of reporters each report the incident, and a plurality of recipients may each receive the report on one incident. In such a case, whether all the cases are associated with the same incident may not be known at the time of reception, and a person who is dispatched to the scene may ascertain during on-site action process that the reports are for the same incident.

FIG. 4 is a diagram illustrating contents of emergency dispatch command information provided through the command receiver terminal 11 for the same incident as in FIG. 3.

FIG. 4 illustrates emergency dispatch command information 2 generated when a report for the same incident is received again in a state in which emergency dispatch command information 1 is generated after the report illustrated FIG. 3 is received. When a victim at the time of generation of the emergency dispatch command information 1 is the same as a victim at the time of generation of the emergency dispatch command information 2, a command receiver receiving the emergency dispatch command information 2 can perform on-site action more effectively if the command receiver has known the emergency dispatch command information 1 in advance.

To the end, an embodiment of the present disclosure aims to provide, in managing emergency dispatch command information according to the reception of a report by a police station or a fire station, other previous emergency dispatch command information relevant to a corresponding emergency dispatch command to a command receiver terminal.

Furthermore, an embodiment of the present disclosure provides a method of determining whether a new command is relevant to a report for the same incident previously reported before the command is issued.

Figure 5:
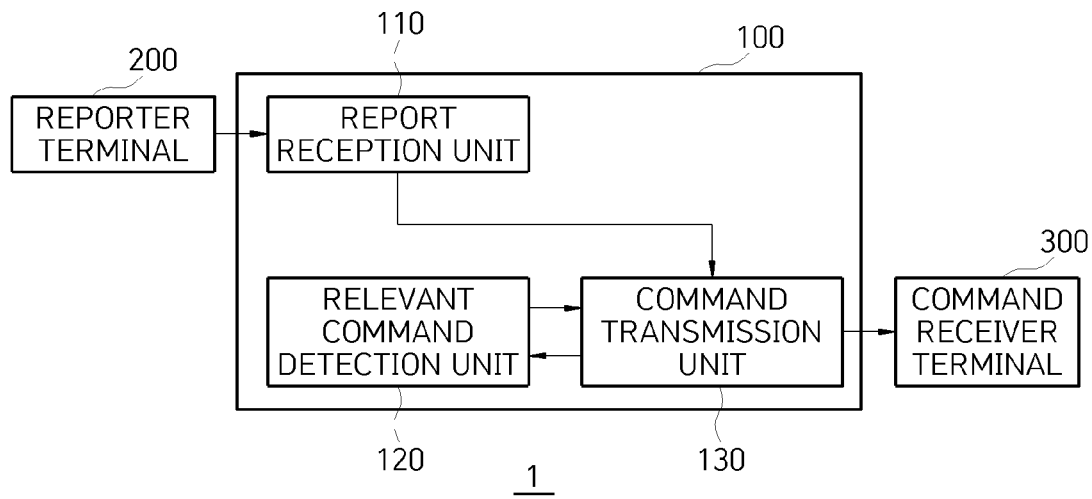
FIG. 5 is a diagram illustrating an emergency dispatch command information management system in accordance with an embodiment of the present disclosure.
Figure 6:
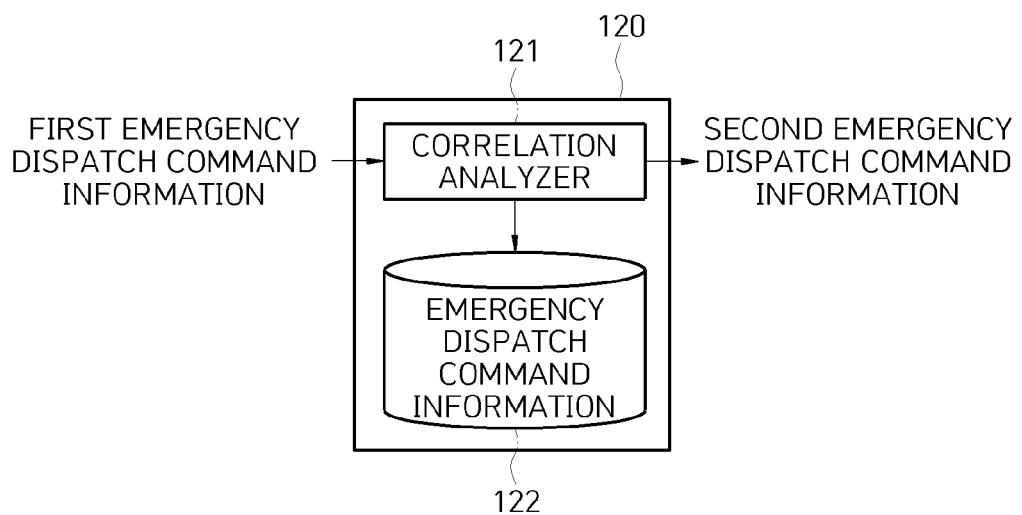
FIG. 6 is a diagram for explaining a relevant command detection unit in accordance with an embodiment of the present disclosure.
Figure 7:
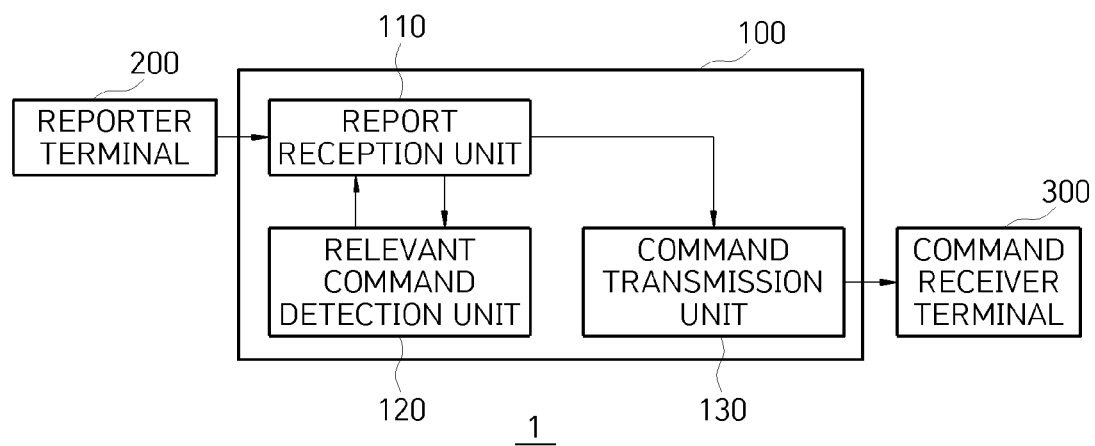
FIG. 7 is a diagram illustrating an emergency dispatch command information management device in accordance with another embodiment of the present disclosure.

FIG. 5 is a diagram illustrating an emergency dispatch command information management system 1 in accordance with an embodiment of the present disclosure. FIG. 6 is a diagram for explaining a relevant command detection unit 120 in accordance with an embodiment of the present disclosure. FIG. 7 is a diagram illustrating an emergency dispatch command information management device 100 in accordance with another embodiment of the present disclosure.

First, referring to FIG. 5, the emergency dispatch command information management system 1 capable of providing relevant emergency dispatch command information in accordance with an embodiment of the present disclosure includes a reporter terminal 200, a command receiver terminal 300, and the emergency dispatch command information management device 100.

The reporter terminal 200 transmits report input data of a report to the emergency dispatch command information management device 100. The command receiver terminal 300 is a terminal which is possessed by a police officer or a firefighter scheduled to be dispatched to the scene or is on his/her way and receives emergency dispatch command information.

The emergency dispatch command information management device 100 detects and provides a relevant command determined to be relevant to the emergency dispatch command information 2 among emergency dispatch command information generated before the emergency dispatch command information 2 in FIG. 4 is generated, and includes a report reception unit 110, the relevant command detection unit 120, and a command transmission unit 130.

The report reception unit 110 receives report reception data from the reporter terminal 200. The report is received by a recipient, and the recipient inputs report contents and notes necessary for on-site action through a phone call, generates reception input data, and generates emergency dispatch command information according to the contents. The reception input data is generally generated by the recipient, but in an embodiment of the present disclosure, the report reception unit 110 may automatically generate reception input data on the basis of the report input data, and generate emergency dispatch command information on the basis of the reception input data. The command information generated by the report reception unit 110 in this way is referred to as first emergency dispatch command information, and the first emergency dispatch command information is provided to the command transmission unit 130.

When receiving the first emergency dispatch command information, the command transmission unit 130 first provides the first emergency dispatch command information to the relevant command detection unit 120 instead of directly providing the first emergency dispatch command information to the command receiver terminal 300.

Referring to FIG. 6, the relevant command detection unit 120 includes a correlation analyzer 121 and an emergency dispatch command history database (DB) 122. When receiving the first emergency dispatch command information, the correlation analyzer 121 detects at least one second emergency dispatch command information relevant to the first emergency dispatch command information from the emergency dispatch command history DB 122.

The first emergency dispatch command information is command information generated by receiving a new report on a corresponding incident, and the second emergency dispatch command information corresponds to command information that has already been generated before the first emergency dispatch command information is generated.

The relevant command detection unit 120 provides the detected second emergency dispatch command information to the command transmission unit 130, and the command transmission unit 130 transmits the first and second emergency dispatch command information to the command receiver terminal 300.

Accordingly, a person, such as a police officer or a firefighter who is to be dispatched and holds the command receiver terminal 300, can simultaneously ascertain a new command and a relevant command.

On the other hand, in an embodiment of the present disclosure, the relevant command detection unit 120 may extract the second emergency dispatch command information relevant to the first emergency dispatch command information on the basis of at least one of time information, location information, incident type, and report contents.

First, the relevant command detection unit 120 waits for transmission of new first emergency dispatch command information from the command transmission unit 130.

In an embodiment, when receiving the first emergency dispatch command information from the command transmission unit 130, the relevant command detection unit 120 may search for recent report time-based emergency dispatch command information on the basis of the report time of the first emergency dispatch command information, and extract searched report time-based emergency dispatch command information as the second emergency dispatch command information.

That is, when a new command is received, the correlation analyzer 121 may search for another command history recently generated from the emergency dispatch command history DB 122 on the basis of the report time of the new command, and extract a satisfactory emergency dispatch command history command as the second emergency dispatch command information when there is the history in the emergency dispatch command history DB 122.

At this time, when there are no other emergency dispatch command information received within a predetermined time range on the basis of the report time of the first emergency dispatch command information, the relevant command detection unit 120 may determine that there is no relevant second emergency dispatch command information.

Furthermore, the relevant command detection unit 120 in accordance with an embodiment of the present disclosure may further reflect distance-based emergency dispatch command information satisfying a preset distance standard among the searched report time-based emergency dispatch command information, and extract the second emergency dispatch command information.

That is, in a case where there are other emergency dispatch command information received within the predetermined time range, when there is command history with the location of generation close enough to be determined as a report of the same incident as a new command among a set of the report time-based emergency dispatch command information, the correlation analyzer 121 may extract the corresponding command as the second emergency dispatch command information.

At this time, when there are no other emergency dispatch command information satisfying the preset distance standard among the searched report time-based emergency dispatch command information, the relevant command detection unit 120 may determine that there is no relevant second emergency dispatch command information.

Through the above process, all of the second emergency dispatch command information extracted in an embodiment of the present disclosure includes commands whose time and location are relevant to the first emergency dispatch command information.

In the aforementioned embodiment, the time information and the distance information may be applied respectively or sequentially and extracted as the second emergency dispatch command information. That is, only the time information may be considered or only the distance information may be considered, or the time information may be checked first, extracted from the emergency dispatch command history DB 122, compared with the distance information, and then extracted as the second emergency dispatch command information. In contrast, the distance information may be checked first, extracted from the emergency dispatch command history DB 122, compared with the time information, and then extracted as the second emergency dispatch command information.

Furthermore, in the aforementioned embodiment, the time information and the distance information may be preset and managed on the basis of emergency, importance, the scale of incident, and the like set for each incident type.

In addition, the relevant command detection unit 120 in accordance with an embodiment of the present disclosure may compare the incident type of the extracted distance-based emergency dispatch command information (or report time-based emergency dispatch command information) with the incident type of the first emergency dispatch command information, and extract incident type-based emergency dispatch command information determined to have the same category as a result of the comparison, as the second emergency dispatch command information.

That is, the correlation analyzer 121 may compare the correlation between the incident type of a new command and the incident type of emergency dispatch command information extracted according to time and distance, and extract these commands as the second emergency dispatch command information when there is a correlation therebetween.

Similarly, when there is no emergency dispatch command information having an incident type in the same category as the incident type of the first emergency dispatch command information among the extracted distance-based emergency dispatch command information, the relevant command detection unit 120 may determine that there is no relevant second emergency dispatch command information.

Regarding the correlation between incident types, for example, when a new command is violence and the type of command belonging to a set of commands extracted in a previous step is a traffic accident, it may be determined that there is little correlation, but when the new command is violence and the type of command is violence, it may be determined that there is a high correlation.

Such a correlation between incident types may be managed after the degree of correlation is set through matching with each of a plurality of incident types in advance. Such a correlation may be continuously updated by the correlation analyzer 121. That is, as the first and second emergency dispatch command information are continuously generated and provided, the correlation analyzer 121 may use the first and second emergency dispatch command information as learning data and continuously improve its performance by learning through a predetermined artificial intelligence algorithm (CNN, DNN, RNN, or the like).

Furthermore, the relevant command detection unit 120 in accordance with an embodiment of the present disclosure may detect the relevant second emergency dispatch command information on the basis of report contents of the incident type-based emergency dispatch command information extracted in the previous step and report contents of the first emergency dispatch command information.

At this time, for the purpose of comparison of report contents, a method is required to detect a correlation by comparing the report contents written in natural language.

To this end, the correlation analyzer 121 may extract keywords from the report contents of the incident type-based emergency dispatch command information and the report contents of the first emergency dispatch command information, and then determine whether to detect the relevant second emergency dispatch command information by comparing the extracted keywords.

As described above, an embodiment of the present disclosure is characterized in that the time information, the distance information, the incident type information, and the report content information are used in order to detect the relevant second emergency dispatch command information, and as described above, the second emergency dispatch command information may be detected by using each piece of information independently or by using each piece of information in a complex manner.

Referring to FIG. 7, the emergency dispatch command information management device in accordance with an embodiment of the present disclosure may also detect the relevant second emergency dispatch command information through direct cooperation between the report reception unit 110 and the relevant command detection unit 120.

That is, when receiving report input data and generating reception input data, the report reception unit 110 generates the first emergency dispatch command information on the basis of the reception input data. Then, when the relevant command detection unit 120 detects at least one second emergency dispatch command information relevant to the first emergency dispatch command information from the emergency dispatch command history DB 122, and returns the detected second emergency dispatch command information to the report reception unit 110, the report reception unit 110 transmits the first and second emergency dispatch command information to the command transmission unit 130.

Accordingly, the command transmission unit 130 transmits the first and second emergency dispatch command information to the command receiver terminal 300.

On the other hand, it has been described in an embodiment of the present disclosure that the second emergency dispatch command information is detected and provided according to a predetermined condition; however, the present disclosure is not necessarily limited thereto and it is of course that second emergency dispatch command information manually detected by a recipient may also be provided together with the first emergency dispatch command information.

In some cases, when considering the correlation of contents of a newly received report according to determination, the recipient may determine that it is the same incident relevant to a relevant command generated previously. In such a case, the recipient may also transmit the contents of the newly received report to an on-site dispatch team that has already departed as additional information without transmitting it as a separate command.

Alternatively, when it is determined that the priority of the contents of the newly received report is higher than that of the previously transmitted commands, the recipient may primarily issue a new command, additionally search for a relevant command, and then provide the result.

Hereinafter, an emergency dispatch command information management method capable of providing relevant emergency dispatch command information in accordance with an embodiment of the present disclosure will be described with reference to FIGS. 8A and 8B.

FIGS. 8A and 8B are flowchart illustrating the emergency dispatch command information management method in accordance with an embodiment of the present disclosure.

Respective steps illustrated in FIGS. 8A and 8B may be understood to be performed by the emergency dispatch command information management device 100 described with reference to FIG. 5 to FIG. 7; however, the present disclosure is not necessarily limited thereto.

First, when report input data is received from the reporter terminal 200 (S110), reception input data of a recipient is generated on the basis of the report input data (S120).

Next, first emergency dispatch command information is generated on the basis of the reception input data (S130).

After the first emergency dispatch command information is generated, at least one second emergency dispatch command information relevant to the generated first emergency dispatch command information is detected (S140).

Specifically, recent report time-based emergency dispatch command information S1 is searched for on the basis of a report time of the first emergency dispatch command information (S141). Then, when there is searched report time-based emergency dispatch command information, it is configured as a set S1 of the second emergency dispatch command information (S142).

Next, distance-based emergency dispatch command information satisfying a preset distance standard is searched for among the searched report time-based emergency dispatch command information S1 (S143). Then, when there is searched distance-based emergency dispatch command information, it is updated to the set S1 of the second emergency dispatch command information (S144).

Next, an incident type of the extracted distance-based emergency dispatch command information is compared with an incident type of the first emergency dispatch command information (S145), and incident type-based emergency dispatch command information determined to have the same category as a result of the comparison is extracted as the second emergency dispatch command information to update the set S1 (S146).

Next, report contents of the extracted incident type-based emergency dispatch command information are compared with report contents of the first emergency dispatch command information to detect the relevant second emergency dispatch command information (S147).

When the second emergency dispatch command information is detected through the above process, the first emergency dispatch command information and the second emergency dispatch command information are transmitted to the command receiver terminal 300 (S150).

In the above description, step S110, S120, S130, S140, and S150 may be further divided into additional steps or combined into fewer steps according to an implementation example of the present disclosure. Furthermore, some steps may be omitted as needed, or the order between the steps may be changed. In addition, even though there are other omitted contents, the contents of FIG. 5 to FIG. 7 may be applied to the emergency dispatch command information management method of FIGS. 8A and 8B.

The above-described embodiment of the present disclosure may be implemented as a program (or application) and stored in a medium, so as to be executed through a computer as hardware which is coupled thereto.

The above-described program may include codes written by a computer language such as C, C++, JAVA, Ruby or machine language, which can be read by a processor (CPU) of the computer through a device interface of the computer, in order to execute the above-described method which is implemented as a program read by the computer. Such codes may include a functional code related to a function defining functions required for executing the above-described methods, and include an execution procedure-related control code required for the processor of the computer to execute the functions according to a predetermined procedure. Furthermore, such codes may further include additional information required for the processor of the computer to execute the functions or a memory reference-related code indicating the position (address) of an internal or external memory of the computer, where a medium needs to be referred to. Furthermore, when the processor of the computer needs to communicate with another remote computer or server in order to execute the functions, the codes may further include communication-related codes indicating how to communicate with another remote computer or server by using a communication module of the computer and which information or media to transmit during communication.

The stored medium does not indicate a medium such as a register, cache or memory, which stores data for a short moment, but indicates a medium which semi-permanently stores data and can be read by a device. Specifically, examples of the storage medium include a ROM, RAM, CD-ROM, magnetic tape, floppy disk, optical data storage device and the like, but the present disclosure is not limited thereto. That is, the program may be stored in various recording media on various servers which the computer can access or various recording media of a user's computer. Furthermore, the media may store codes which can be distributed in computer systems connected through a network, and read by computers in a distributed manner.

The descriptions of the present disclosure are only examples, and those skilled in the art to which the present disclosure pertains will understand that the present disclosure can be easily modified into other specific forms without changing the technical spirit or essential features of the present disclosure. Therefore, it should be understood that the above-described embodiments are only illustrative in all aspects and are not limitative. For example, components described in a singular form may be distributed and embodied. Similarly, distributed components may be embodied in a coupled form.

The scope of the present disclosure is defined by the claims to be described below rather than the detailed description, and it should be construed that the meaning and scope of the claims and all changes or modified forms derived from the equivalent concept thereof are included in the scope of the present disclosure.

What is claimed is:

1. An emergency dispatch command information management method capable of providing relevant emergency dispatch command information, the emergency dispatch command information management method comprising:
   a step of receiving report input data from a reporter terminal;
   a step of generating reception input data of a recipient on the basis of the report input data;
   a step of generating first emergency dispatch command information on the basis of the reception input data;
   a step of detecting at least one second emergency dispatch command information relevant to the generated first emergency dispatch command information; and
   a step of transmitting the first and second emergency dispatch command information to a command receiver terminal;
   wherein the step of detecting at least one emergency dispatch command information relevant to the generated first emergency dispatch command information comprises:
   a step of searching for recent report time-based emergency dispatch command information on the basis of a report time of the first emergency dispatch command information; and
   a step of extracting, as the second emergency dispatch command information, distance-based emergency dispatch command information satisfying a preset distance standard among the searched report time-based emergency dispatch command information.

2. The emergency dispatch command information management method of claim 1, further comprising:
   a step of determining that there is no relevant second emergency dispatch command information when there is no other emergency dispatch command information received within a predetermined time range on the basis of the report time of the first emergency dispatch command information.

3. The emergency dispatch command information management method of claim 1, further comprising:
   a step of determining that there is no relevant second emergency dispatch command information when there is no other emergency dispatch command information satisfying the preset distance standard among the searched report time-based emergency dispatch command information.

4. The emergency dispatch command information management method of claim 1, wherein the step of detecting at least one second emergency dispatch command information relevant to the generated first emergency dispatch command information further comprises:
   a step of comparing an incident type of the extracted distance-based emergency dispatch command information with an incident type of the first emergency dispatch command information; and
   a step of extracting, as the second emergency dispatch command information, incident type-based emergency dispatch command information determined to have a same category as a result of the comparison.

5. The emergency dispatch command information management method of claim 4, further comprising:
   a step of determining that there is no relevant second emergency dispatch command information when there is no emergency dispatch command information having an incident type in the same category as the incident type of the first emergency dispatch command information among the extracted distance-based emergency dispatch command information.

6. The emergency dispatch command information management method of claim 4, wherein the step of detecting at least one second emergency dispatch command information relevant to the generated first emergency dispatch command information further comprises:
   a step of detecting the relevant second emergency dispatch command information on the basis of report contents of the extracted incident type-based emergency dispatch command information and report contents of the first emergency dispatch command information.

7. The emergency dispatch command information management method of claim 6, wherein the step of detecting the relevant second emergency dispatch command information on the basis of the report contents of the extracted incident type-based emergency dispatch command information and the report contents of the first emergency dispatch command information comprises:
   a step of extracting keywords from the report contents of the incident type-based emergency dispatch command information and the report contents of the first emergency dispatch command information; and
a step of determining whether to detect the relevant second emergency dispatch command information by comparing the extracted keywords.

8. An emergency dispatch command information management device capable of providing relevant emergency dispatch command information, the emergency dispatch command information management device comprising:
a report reception unit configured to receive report input data from a reporter terminal, generate reception input data of a recipient on the basis of the report input data, and generate first emergency dispatch command information on the basis of the reception input data;
a relevant command detection unit configured to detect at least one second emergency dispatch command information relevant to the generated first emergency dispatch command information; and
a command transmission unit configured to transmit the first and second emergency dispatch command information to a command receiver terminal;
wherein the relevant command detection unit searches for recent report time-based emergency dispatch command information on the basis of a report time of the first emergency dispatch command information, and extracts, as the second emergency dispatch command information, distance-based emergency dispatch command information satisfying a preset distance standard among the searched report time-based emergency dispatch command information.

9. The emergency dispatch command information management device of claim 8, wherein when there is no other emergency dispatch command information received within a predetermined time range on the basis of the report time of the first emergency dispatch command information, the relevant command detection unit determines that there is no relevant second emergency dispatch command information.

10. The emergency dispatch command information management device of claim 9, wherein when there is no other emergency dispatch command information satisfying the preset distance standard among the searched report time-based emergency dispatch command information, the relevant command detection unit determines that there is no relevant second emergency dispatch command information.

11. The emergency dispatch command information management device of claim 8, wherein the relevant command detection unit compares an incident type of the extracted distance-based emergency dispatch command information with an incident type of the first emergency dispatch command information, and extracts, as the second emergency dispatch command information, incident type-based emergency dispatch command information determined to have a same category as a result of the comparison.

12. The emergency dispatch command information management device of claim 11, wherein when there is no emergency dispatch command information having an incident type in the same category as the incident type of the first emergency dispatch command information among the extracted distance-based emergency dispatch command information, the relevant command detection unit determines that there is no relevant second emergency dispatch command information.

13. The emergency dispatch command information management device of claim 11, wherein the relevant command detection unit detects the relevant second emergency dispatch command information on the basis of report contents of the extracted incident type-based emergency dispatch command information and report contents of the first emergency dispatch command information.

14. The emergency dispatch command information management device of claim 13, wherein the relevant command detection unit extracts keywords from the report contents of the incident type-based emergency dispatch command information and the report contents of the first emergency dispatch command information, and determines whether to detect the relevant second emergency dispatch command information by comparing the extracted keywords.

15. An emergency dispatch command information management system capable of providing relevant emergency dispatch command information, the emergency dispatch command information management system comprising:
a reporter terminal configured to transmit report input data of a reporter;
an emergency dispatch command information management device configured to receive the report input data from the reporter terminal, generate reception input data of a recipient on the basis of the report input data, generate first emergency dispatch command information on the basis of the reception input data, and detect at least one second emergency dispatch command information relevant to the generated first emergency dispatch command information; and
a command receiver terminal configured to receive the first and second emergency dispatch command information;
wherein the emergency dispatch command information management device is configured to search for recent report time-based emergency dispatch command information on the basis of a report time of the first emergency dispatch command information, and extract, as the second emergency dispatch command information, distance-based emergency dispatch command information satisfying a preset distance standard among the searched report time-based emergency dispatch command information.

* * * * *